United States Patent

Barthe et al.

[11] Patent Number: 5,876,681
[45] Date of Patent: Mar. 2, 1999

[54] SPINEL-BASED CATALYSTS FOR REDUCING EXHAUST EMISSIONS OF $NO_x$

[75] Inventors: Philippe Barthe, Saint Martin Du Tertre; Pierre Macaudiere, Asnieres/Seine; Thierry Seguelong, Nanterre, all of France

[73] Assignee: Rhone-Poulenc Chimie, Courbevoie Cedex, France

[21] Appl. No.: 972,173

[22] Filed: Nov. 18, 1997

Related U.S. Application Data

[62] Division of Ser. No. 418,686, Apr. 7, 1995, Pat. No. 5,736,114.

[30] Foreign Application Priority Data

Apr. 8, 1994 [FR] France ................................ 94-04158

[51] Int. Cl.⁶ .......................... B01D 53/56; B01D 53/94; B01J 101/80
[52] U.S. Cl. .................................. 423/237.1; 423/213.2; 423/213.5; 502/514; 502/524
[58] Field of Search .................... 502/524, 514; 423/239.1, 213.5, 213.2

[56] References Cited

U.S. PATENT DOCUMENTS

| | | | |
|---|---|---|---|
| 3,368,982 | 2/1968 | Milbourne | 502/524 |
| 3,904,553 | 9/1975 | Campbell et al. | 252/465 |
| 4,228,138 | 10/1980 | Sermon | 423/239 |
| 4,261,862 | 4/1981 | Kinoshita et al. | 252/462 |
| 4,274,981 | 6/1981 | Suzuki et al. | 252/438 |
| 4,790,982 | 12/1988 | Yoo et al. | 423/239 |
| 4,963,520 | 10/1990 | Yoo et al. | 502/64 |
| 5,364,517 | 11/1994 | Dieckman et al. | 208/121 |
| 5,736,114 | 4/1998 | Barthe et al. | 423/213.2 |

FOREIGN PATENT DOCUMENTS

| | | |
|---|---|---|
| 0210681A1 | 2/1987 | European Pat. Off. |
| 2146358 | 3/1973 | France . |
| 2 257 326 | 9/1975 | France . |
| 2 419 754 | 11/1979 | France . |
| 2 431 321 | 3/1980 | France . |
| 3727642A1 | 3/1989 | Germany . |
| 07024317 A | 1/1995 | Japan . |
| 07080300 A | 3/1995 | Japan . |

OTHER PUBLICATIONS

Nippon Kagaku Kaishi, vol. 7, pp. 1036–1038 (1991) No Month, Published by the Chemical Society of Japan.

*Primary Examiner*—Gary P. Straub
*Assistant Examiner*—Timothy C. Vanoy
*Attorney, Agent, or Firm*—Burns, Doane, Swecker & Mathis, L.L.P.

[57] ABSTRACT

Oxygen-rich exhaust gases, for example those emanating from internal combustion engines, e.g., diesel engines, are catalytically treated/converted to reduce emissions of $NO_x$, in the presence of a catalytically effective amount of a spinel mass oxide essentially having the formula $ZnAl_2O_4$ which was prepared by forming a solution or suspension of the salts of the constituent elements of the mass oxide, drying by atomizing the solution or suspension and calcining the salts of the constituent elements of the mass oxide so as to result in the spinel mass oxide.

14 Claims, No Drawings

SPINEL-BASED CATALYSTS FOR REDUCING EXHAUST EMISSIONS OF NO$_x$

This application is a divisional, of application Ser. No. 08/418,686, filed Apr. 7, 1995 now U.S. Pat. No. 5,736,114.

BACKGROUND OF THE INVENTION

1. Field of the Invention

The present invention relates to the treatment/conversion of "oxygen-rich" exhaust gases by means of spinel-based catalysts, for reducing emissions of the oxides of nitrogen ("NO$_x$").

2. Description of the Prior Art

Emissions of oxides of nitrogen, NO$_x$, from exhaust gases, in particular from automotive engines, can be reduced by "three-way" catalysts which utilize, stoichiometrically, the reducing gases present in the exhaust mixture. Any excess oxygen results in a severe deterioration of catalyst performance.

Certain engines, such as diesel engines or lean burning engines, economize on fuel, but emit exhaust gases which permanently contain a large excess of oxygen, for example an excess of at least 5%. A standard three-way catalyst is thus of no value for the conversion of NO$_x$ emissions from these engines. Further, limiting NO$_x$ emissions has become imperative because of the increasingly strict regulations governing automotive exhaust emissions which now cover this type of engine.

Serious need thus exists in this art for an effective catalyst which can improvedly reduce NO$_x$ emissions.

SUMMARY OF THE INVENTION

Accordingly, a major object of the present invention is the provision of catalysts for improvedly treating/converting NO$_x$-containing exhaust gases containing a high oxygen content.

Briefly, the present invention features, in a first embodiment thereof, catalysts comprising a mass oxide with a spinel structure and having the formula ZnAl$_2$O$_4$, for the treatment/conversion of exhaust gases containing a high concentration of oxygen to reduce emissions of the oxides of nitrogen.

In a second embodiment thereof, the present invention features catalysts comprising an oxide with a normal or an inverse spinel structure with the exception of ZnAl$_2$O$_4$, also for the treatment/conversion of exhaust gases containing a high concentration of oxygen to reduce emissions of the oxides of nitrogen.

DETAILED DESCRIPTION OF BEST MODE AND PREFERRED EMBODIMENTS OF THE INVENTION

More particularly according to the present invention, the subject catalysts have an operating temperature which at least ranges from 450° C. to 600° C. The subject catalysts are also stable enough to remain active even when the temperature is increased above 600° C. or even above 700° C.

As indicated above, there are two embodiments of catalysts of the present invention, which will now be more fully described.

As utilized herein, by the term "spinel" are intended compounds having a general global formula AB$_2$O$_4$ wherein A and B are typically transition metal ions of approximately the same size, A generally being a divalent ion and B a trivalent ion. By the term "inverse spinel structure" are intended compounds having the general formula B(AB)O$_4$. It should also be appreciated that any of the description below which relates to the spinel structure is applicable to both the normal and to the inverse spinel structure.

In the first embodiment, the catalyst comprises a spinel having the formula ZnAl$_2$O$_4$ as the active catalytic phase. In this case, such active phase is in the form of a mass oxide. By "mass oxide" is intended that the spinel ZnAl$_2$O$_4$ is present uniformly and homogeneously throughout the volume of the active phase and not, for example, deposited only onto the surface thereof.

In the second embodiment, the catalyst comprises a normal spinel or an inverse spinel having a formula other than ZnAl$_2$O$_4$.

More particularly in the second embodiment, the oxide with the normal or inverse spinel structure has the following global formula (I):

$$AB_2O_4 \tag{I}$$

wherein A is at least one element selected from Groups IIa, Ib, IIb, IIIb, IVb and Vb of the Periodic Table, and also the transition metal elements; and B is at least one element selected from Groups IVa, VIa, VIIa, VIII, Ib to Vb of the Periodic Table.

The Periodic Table referred to is that published in the "Supplément au Bulletin de la Société Chimique de France," no. 1 (January 1966). By the term "transition metal elements" are intended those from Groups IVa to VIII.

Preferably, the oxide with the normal or inverse spinel structure has formula (I) where A is at least one element selected from among Mg, Ti, Mn, Fe, Co, Ni, Cu, Zn and Sn, and B is at least one element selected from among Ti, Mn, Cr, Fe, Co, Ni, Cu, Zn, Al, Ga, In, Sn and Sb.

Exemplary spinels having formula (I) are those in which B is aluminum or gallium.

It is also within the scope of the present invention to employ compounds which are in the form of a mixture of spinels with a normal or inverse structure.

Further, as indicated above, in the subject catalyst compositions, elements such as Zn, Cu, Sn and Sb are used which are volatile. Thus, because of the preparation temperature for the spinels and the volatility of these elements, compounds formed therefrom contain gaps and can be represented by the formula A$_{1-x}$B$_x$B$_{2-x}$O$_4$. These products can, of course, also be used according to this invention. It will be appreciated that lacunal products of the same type can also be prepared using starting materials which are lacking in full or complete stoichiometry. These products can also be used according to this invention.

The catalysts of the present invention can comprise, other than the active spinel-based phase described above, any precious metal which is typically employed in catalysis, such as platinum, palladium, rhodium, ruthenium, silver, gold, indium or rhenium.

In addition, the active phases of these catalysts can be associated with any type of support which is conventionally employed in this field, for example lanthanide oxides such as CeO$_2$, ZrO$_2$, Al$_2$O$_3$, TiO$_2$, or SiO$_2$, these supports optionally being doped, or zeolites, silicates, crystalline silicoaluminum phosphates, or crystalline aluminum phosphates; the silicates or phosphates can contain metallic substituents such as titanium, iron, magnesium, zinc, manganese, cobalt, gallium, lanthanum, copper, molybdenum, chromium, germanium or boron.

The catalysts according to the present invention can be prepared via different procedures.

In a first preparative technique, the oxide with a normal or inverse spinel structure constituting the active phase of the catalyst is obtained by firing the precursors of the constituent elements of the spinel.

These precursors are generally oxides. They are mixed and ground, then optionally shaped under pressure, for example by pelletizing. The mixture is then calcined at a temperature and for a period of time which is sufficient to produce the desired phase. In general, the temperature is at least 700° C. The calcining period is shorter when the temperature is higher. The calcining is advantageously carried out in air and can be carried out in a static atmosphere or in a gas stream. If necessary, several cycles of calcining can be carried out with intermediate grinding and shaping/forming.

In a second procedure, a solution or suspension of the salts of the constituent elements of the spinel is first formed. If necessary, the support can be placed in suspension with the constituent elements.

Exemplary salts include the salts of inorganic acids such as the nitrates, sulfates or chlorides; the nitrates are the preferred.

Organic acid salts can also be used, in particular the salts of saturated aliphatic carboxylic acids or the salts of hydroxycarboxylic acids. Exemplary thereof are the formiates, acetates, propionates, oxalates and citrates.

The solution or suspension thus formed is then dried.

Any known technique for drying can be employed, but preferably atomization is carried out, i.e., spraying the mixture into a hot atmosphere (spray-drying). The atomization can be carried out using any known spraying means, for example a spray nozzle of the diffuser type. Turbine spray means can also be used. The various spraying techniques which are suitable for use in the present process are, in particular, described in the standard text by Masters, "Spray-Drying" (second edition, 1976, George Godwin, London).

It should be appreciated that the spray-drying procedure using a "flash" reactor can also be used, for example of the type described, in particular, in FR-A-2,257,326, FR-A-2,419,754 and FR-A-2,431,321, each assigned to the assignee hereof. In this instance, the treatment gases (hot gases) downwardly descend in a helicoidal motion and flow into a zone of constriction. The mixture to be dried is injected along a trajectory which is aligned with the axis of symmetry of the helicoidal trajectories of the gases, which perfectly transfers the momentum of the gases to the mixture to be treated. The gases thus have a double action: spraying, i.e., transformation of the initial mixture into fine droplets, and drying the droplets obtained. Further, the very low residence time (generally less than about 1/10 of a second) of the particles in the reactor presents the advantage, among others, of limiting any risks of overheating due to too long a contact with the hot gases.

Depending on the respective flow rates of the gases and the mixture to be dried, the inlet temperature of the gases ranges, for example, from 400° C. to 900° C., more particularly 600° C. to 800° C., and the temperature of the dried solids ranges from 110° C. to 250° C., for example, preferably from 125° C. to 200° C.

After drying, the product obtained is calcined. The calcining is carried out at a temperature sufficient to form the desired phase. Normally, this temperature is at least 600° C. The calcining period of time can range from half an hour to 10 hours, for example. This period of time is lower when the calcining temperature is higher. Calcining is typically carried out in air and can be carried out in a static atmosphere or in a gas stream.

In a third technique for preparing the catalysts of the invention, a mixture of the precursors of the constituent elements of the spinel and a source of carbon and nitrogen is formulated. The mixture can be in the form of a solution.

The precursors which are typically employed are salts of the respective elements, more particularly the nitrates or chlorides.

The carbon and nitrogen source is usually an organic compound, for example urea or glycine.

The mixture is then subjected to combustion by heating it to a sufficient temperature, generally at least 300° C., for example 500° C. In the case of a solution, this is heated to its boiling point in the furnace before flaming or firing. Very high calcining temperatures can be transitionally produced in the mixture. The reaction temperature can be modified by altering the carbon and nitrogen source/precursor molar ratio.

Following combustion, the product is ground, if necessary.

It is of course possible to use procedures to prepare the active phases other than those described above. Sol/salt, sol/gel or aqueous or organic precipitation techniques may, for example, be employed.

The catalysts can be utilized in different forms such as granules, spherules, cylinders, or honeycombs of different dimensions. They can also be employed in catalytic systems comprising a coating (wash coat) based on the active phases described above, deposited onto a substrate which is, for example, a monolithic metal or ceramic.

The invention also features the treatment of exhaust gases containing an excess of oxygen. The term "excess of oxygen" or "oxygen-rich" means a concentration (expressed as the volume) of at least 5% of this element, more particularly at least 10%, this concentration ranging, for example, from 5% to 15%. In this event, one of the reactions sought to be catalyzed is the reaction of HC (hydrocarbons)+$NO_x$.

The present invention thus features the production of any of the catalytic systems described above, based on active catalysts which have also been described above, for the treatment or conversion of exhaust gases containing an excess of oxygen.

Exemplary hydrocarbons which can be used as a reducing agent for the elimination or conversion of $NO_x$ include, in particular, gases or liquids from saturated, ethylenic, acetylenic, or aromatic carbon-containing compounds and hydrocarbons from petroleum cuts such as methane, ethane, propane, butane, pentane, hexane, ethylene, propylene, acetylene, butadiene, benzene, toluene, xylene, kerosine and diesel fuel.

Exemplary organic oxygen-containing compounds include, in particular, the alcohols, for example saturated alcohols such as methanol, ethanol or propanol, the ethers such as methyl ether or ethyl ether, the esters such as methyl acetate, and ketones.

The gases which can be treated according to the present invention include, for example, those emanating from gas turbines, power station furnaces or internal combustion engines, in particular diesel engines or lean burning engines.

In order to further illustrate the present invention and the advantages thereof, the following specific examples are given, it being understood that same are intended only as illustrative and in nowise limitative.

In said examples to follow, the products obtained were tested as indicated to evaluate their catalytic performances.

1.5 g of powdered catalyst were charged into a quartz reactor.

The reaction mixture at the reactor inlet had the following composition (by volume):

NO=900 vpm
$C_3H_6$=900 vpm
$O_2$=5%
$CO_2$=10%
$H_2O$=10%
$N_2$=qsp 100%

The total flow rate was 10 Nl/h.

The VVH was on the order of 10,000 $h^{-1}$.

The signals monitoring HC ($C_3$–$H_6$), No and $NO_x$ ($NO_x$= $NO+NO_2$) were recorded constantly, as was the temperature in the reactor.

The HC signal was provided by a Beckman total HC detector, based on the principle of flame ionization detection.

The NO and $NO_x$ signals were provided by an Ecophysics $NO_x$ analyzer based on the principle of chemiluminescence: it provided values for NO, $NO_x$ and $N_2$) the latter being calculated by the difference between the $NO_x$ and NO signals.

The catalytic activity was measured from the HC, NO, $NO_2$ and $NO_x$ signals as a function of temperature during a programmed temperature increase from 20° C. to 700° C. at 3.75° C./min and from the following relationships:

(a) The conversion ratio of NO (TNO) in %, given by: TC(NO)=100 (NO°-NO)/NO° wherein NO° is the NO signal at t=0 which corresponds to the start of the temperature program, (b) The conversion ratio of HC (THC) in %, given by: T(HC)=100(HC°-HC)/HC° wherein HC° is the HC signal at t=0 which corresponds to the start of the temperature program, (c) The conversion ratio of $NO_x$ ($TNO_x$) in %, given by: $TC(NO_x)=100(NO_x°-NO_x)/NO_x°$ wherein $NO^{x°}$ is the $NO_x$ signal at t=0 which corresponds to the start of the temperature program.

Lastly, by the term "specific surface area" is intended the BET specific surface area determined by adsorption of nitrogen in accordance with standard ASTM D 3663-78 which is based on the BRUNAUER-EMMET-TELLER method described in *The Journal of the American Chemical Society*, 60, 309 (1938).

EXAMPLE 1

This example relates to a catalyst having the formula $ZnAl_2O_4$.

Oxides (ZnO, $Al_2O_3$), mixed and ground in an agate mortar then pelletized at 1 metric ton/$cm^2$, were used as the precursor compounds. The mixture was then calcined in air in an aluminum crucible.

The compound $ZnAl_2O_4$ was obtained after two calcining cycles at 1,000° C. for 15 hours, with intermediate grinding and pelletizing. Under these conditions, X-ray diffraction evidenced the presence of $ZnAl_2O_4$. The BET specific surface area was less than 0.50 $m^2/g$.

The catalyst performances are reported in Table 1 below.

These performances indicated:

(1) a good level of activity (maximum global $NO_x$ conversion at 540° C. of about 20%) considering the very low specific surface area (<0.50 $m^2/g$);

(2) a $NO_x$ conversion range of 450° C. to 600° C.

TABLE 1

| Temperature (°C.) | THC | TNO | $TNO_x$ |
|---|---|---|---|
| 399 | 0.0 | 0.0 | 0.0 |
| 450 | 2.3 | 0.0 | 2.1 |
| 498 | 11.1 | 3.1 | 11.2 |
| 550 | 45.6 | 9.9 | 19.6 |
| 599 | 86.0 | 4.7 | 3.3 |
| 649 | 95.2 | 10.6 | 1.9 |

EXAMPLE 2

This example relates to a catalyst of the same type as that of Example 1, but prepared via a different route.

A mixture of nitrates containing 0.2 mol/l of Zn and 0.4 mol/l of Al was dried by Buchi atomization. The gas inlet temperature was 240° C. and the product outlet temperature was 115° C., with an atomization flow rate of 800 ml/h. The powder obtained was calcined for 6 h at 800° C. in an aluminum boat, with a programmed temperature increase of 5° C./min: X-ray diffraction evidenced a perfectly crystallized $ZnAl_2O_4$ phase. In this instance, the BET specific surface area was 33 $m^2/g$.

The catalyst performances are reported in Table 2 below, which indicated:

(1) a remarkable level of activity (maximum global $NO_x$ conversion at 550° C. of about 40%), considering the specific surface area of the catalyst (33 $m^2/g$);

(2) a large $NO_x$ conversion range of 350° C. to 600° C.

TABLE 2

| Temperature (°C.) | THC | TNO | $TNO_x$ |
|---|---|---|---|
| 350 | 1.1 | 6.4 | 4.0 |
| 400 | 7.4 | 7.1 | 8.1 |
| 449 | 25.9 | 16.7 | 21.4 |
| 500 | 56.9 | 31.9 | 36.3 |
| 549 | 80.4 | 36.1 | 40.2 |
| 600 | 94.8 | 20.2 | 17.8 |
| 649 | 97.7 | 21.9 | 6.4 |

EXAMPLE 3

This example relates to a catalyst having the formula $Sn_{0.025}Zn_{0.975}Al_2O_4$.

A mixture of nitrates containing 0.195 mol/l of Zn, 0.4 mol/l of Al and 0.005 mol/l of Sn was dried by Büchi atomization. The gas inlet temperature was 245° C. and the product outlet temperature was 115° C., with an atomization flow rate of 850 ml/h. The powder obtained was calcined for 6 h at 800° C. in an aluminum boat, with a programmed temperature increase of 5° C./min. X-ray diffraction of the powder evidenced a pure phase with a system of Bragg peaks which was similar to that of $ZnAl_2O_4$. The BET specific surface area was 34 $m^2/g$.

The catalyst performances are reported in Table 3 below, which indicated:

(1) a remarkable level of activity (maximum global $NO_x$ conversion at 490° C. of about 40%) , considering the specific surface area of the catalyst;

(2) a large $NO_x$ conversion range of 400° C. to 600° C.

TABLE 3

| Temperature (°C.) | THC | TNO | $TNO_x$ |
|---|---|---|---|
| 349 | 0.0 | 1.4 | 0.0 |
| 398 | 5.2 | 1.6 | 2.9 |
| 449 | 29.5 | 15.3 | 20.2 |
| 499 | 62.7 | 32.8 | 39.7 |
| 549 | 86.5 | 27.5 | 32.9 |
| 599 | 94.6 | 18.3 | 16.3 |
| 650 | 97.1 | 17.4 | 5.6 |

EXAMPLE 4

This example relates to a catalyst having the formula $ZnGa_2O_4$.

The oxides ZnO and $Ga_2O_4$, mixed and ground in an agate mortar then pelletized at 1 metric ton/cm², were used as the precursor compounds. The mixture was then calcined in air in an aluminum crucible. The compound $ZnGa_2O_4$ was obtained after two calcining cycles at 1000° C. for 15 hours, with intermediate grinding and pelletizing. Under these conditions, X-ray diffraction evidenced the presence of $ZnGa_2O_4$. The BET specific surface area was less than 0.50 m²/g.

The catalyst performances are reported in Table 4 below, which indicated:

(1) a good level of activity (maximum global $NO_x$ conversion at 530° C. of about 25%) considering the very low specific surface area (<0.50 m²/g);

(2) a $NO_x$ conversion range of 400° C. to 650° C.

TABLE 4

| Temperature (°C.) | THC | TNO | $TNO_x$ |
|---|---|---|---|
| 300 | 0.0 | 5.9 | 1.0 |
| 349 | 0.0 | 7.4 | 2.4 |
| 399 | 0.0 | 6.6 | 3.3 |
| 448 | 2.7 | 8.4 | 7.8 |
| 499 | 19.1 | 16.6 | 19.7 |
| 548 | 55.0 | 21.0 | 22.1 |
| 599 | 86.3 | 12.0 | 9.9 |
| 648 | 94.7 | 8.2 | 6.4 |
| 676 | 97.0 | 10.9 | 5.4 |

In the following examples, the reaction mixture at the reactor inlet had the following composition (by volume):

NO=300 vpm $C_3H_6$=300 vpm $O_2$=10%

$CO_2$=10%

$H_2O$=10%

$N_2$=qsp 100%

Catalytic charge=300 mg

The total flow rate was 10 Nl/h.

The VVH was on the order of 20,000 $h^{-1}$.

In addition, the catalysts were prepared employing the general technique below:

A mixture of salts, sols or oxides in suspension was formulated with stirring by dissolving the salts or placing the sols and oxides in suspension; this was carried out in an appropriate volume of water (salt concentration: 0.25 to 1M/l; suspensions 50 to 250 g/l). This mixture was co-dried in a Buchi drier with an inlet temperature of from 220° C. to 250° C., an outlet temperature of 100° C. to 150° C., and a suspension flow rate of 1.5 ml/min to 15 ml/min.

The powder obtained was calcined at from 500° C. to 900° C., with a programmed temperature increase of 1°/min to 5° min, with a stage of 2 hours to 6 hours at this temperature.

EXAMPLE 5

This example relates to a catalyst having the formula $Zn_{0.9}Al_2O_4$.

It was prepared as described immediately above, using $Zn(NO_3)_2.6H_2O$ and $Al(NO_3)_3.9H_2O$ as the starting compounds.

The catalytic performances are reported in Table 5:

TABLE 5

| Temperature (°C.) | THC | THO | $THO_x$ |
|---|---|---|---|
| 350 | 3.2 | 0 | 0 |
| 400 | 5.5 | 0.1 | 2.8 |
| 450 | 11.9 | 3.1 | 5.0 |
| 500 | 33.4 | 11.7 | 14.6 |
| 550 | 74.3 | 40.4 | 30.0 |
| 600 | 94.8 | 44.2 | 27.6 |
| 650 | 99.9 | 33.4 | 18.0 |
| 700 | 100 | 23.3 | 11.1 |

EXAMPLE 6

This example relates to a catalyst having the global formula $SnZnGa_2O_4$ deposited onto an alumina support.

The tin content was 1.6% by weight. The catalyst was prepared using $Zn(NO_3)_2. 6H_2O$ and $Ga(NO_3)_3$ in solution at a concentration of 3.24 M/l as the starting compounds and an alumina in suspension. The alumina employed was a Condea alumina calcined at 800° C. The proportion of catalyst/alumina support was 20/80.

The catalytic performances are reported in Table 6:

TABLE 6

| Temperature (°C.) | THC | THO | $THO_x$ |
|---|---|---|---|
| 300 | 2.0 | 0 | 0 |
| 350 | 4.5 | 0 | 0 |
| 400 | 10.6 | 0 | 1.6 |
| 450 | 26.7 | 2.5 | 6.5 |
| 500 | 58.3 | 16.8 | 20.2 |
| 550 | 90.4 | 29.8 | 32.9 |
| 600 | 98.7 | 21.2 | 23.9 |
| 650 | 100 | 9.7 | 11.2 |
| 700 | 100 | 1.8 | 4.0 |

EXAMPLE 7

This example relates to a catalyst having the formula $ZnGa_2O_4$ on an alumina support. The alumina employed was a Condea alumina calcined for 2 hours at 750° C. The proportion of catalyst/alumina support was 20/80.

The catalytic performances are reported in Table 7:

TABLE 7

| Temperature (°C.) | THC | TNO | TNO$_x$ |
|---|---|---|---|
| 350 | 5.1 | 0 | 0 |
| 400 | 11.3 | 0 | 1.6 |
| 450 | 25.6 | 4.4 | 8.2 |
| 500 | 60.9 | 17.4 | 20.4 |
| 550 | 91.1 | 38.5 | 39.9 |
| 600 | 97.8 | 42.2 | 38.3 |
| 650 | 100 | 17.4 | 16.3 |
| 700 | 100 | 3.1 | 3.2 |

EXAMPLE 8

This example relates to a catalyst having the formula MgAl$_2$O$_4$.

The catalyst was prepared employing the technique given immediately above using Mg(NO$_3$)$_2$.6H$_2$O and Al(NO$_3$)$_3$.9H$_2$O as the starting compounds. It was tested under the same conditions as those of Examples 5 to 7, but in an amount of 1.5 g and a VVH of 10,000 h$^{-1}$. The catalytic performances are reported in Table 8:

TABLE 8

| Temperature (°C.) | THC | TNO | TNO$_x$ |
|---|---|---|---|
| 400 | 0 | 0 | 0 |
| 450 | 2.2 | 1.2 | 0.7 |
| 500 | 12.6 | 14.7 | 14.7 |
| 550 | 49.7 | 33.9 | 33.8 |
| 600 | 83.6 | 7.7 | 3.7 |
| 650 | 92.4 | 16.5 | 7.2 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the catalytic treatment/conversion of oxygen-rich exhaust gases containing oxygen in an amount of at least 5% by volume to reduce emissions of NO$_x$, the process comprising contacting an oxygen-rich exhaust gas with a catalyst comprising a catalytically effective amount of a spinel mass oxide essentially having the formula ZnAl$_2$O$_4$, wherein the mass oxide is prepared by forming a solution or suspension of salts of the constituent elements of the mass oxide, drying by atomizing the solution or suspension, and calcining the dried salts of the constituent elements of the mass oxide so as to produce the spinel mass oxide.

2. The process as defined by claim 1, said catalyst further comprising a catalytically effective amount of precious metal values.

3. The process as defined by claim 1, said catalyst comprising a catalytically active phase comprising said spinel mass oxide, wherein said catalytically active phase is deposited onto a support substrate.

4. The process as defined by claim 1, wherein said exhaust gases were emitted from either an internal combustion engine, a gas turbine or a power station furnace.

5. The process as defined by claim 4, wherein said exhaust gases were emitted from an internal combustion engine.

6. The process as defined by claim 5, wherein said exhaust gases were emitted from a diesel or lean burning engine.

7. The process as defined by claim 1, wherein said exhaust gases further comprises an NO$_x$-reducing amount of at least one hydrocarbon.

8. The process as defined by claim 1, wherein said exhaust gases further comprises an oxygen-containing organic compound.

9. The process as defined by claim 1, wherein said catalyst is in the form of either pellets cylinders, honeycomb, powder, or an active phase comprising said spinel mass oxide deposited onto a monolithic substrate.

10. The process as defined by claim 1, wherein the exhaust gases contain at least 10% by volume of oxygen.

11. The process as defined by claim 10, wherein the exhaust gases contain oxygen in an amount of from 5% to 15% by volume.

12. A process as defined in claim 1, wherein said catalyst is in the form of granules.

13. A process as defined in claim 1, wherein said catalyst is in the form of beads.

14. A process as defined in claim 1, wherein said catalyst is in the form of spherules.

* * * * *